United States Patent
Zhang et al.

(10) Patent No.: US 8,719,178 B2
(45) Date of Patent: May 6, 2014

(54) PRIORITIZING SOCIAL ACTIVITY POSTINGS

(75) Inventors: Lihui Zhang, Saratoga, CA (US); Krithika Manohar, Sunnyvale, CA (US)

(73) Assignee: SAP AG, Walldorf (DE)

( * ) Notice: Subject to any disclaimer, the term of this patent is extended or adjusted under 35 U.S.C. 154(b) by 169 days.

(21) Appl. No.: 13/338,981

(22) Filed: Dec. 28, 2011

(65) Prior Publication Data
US 2013/0173333 A1 Jul. 4, 2013

(51) Int. Cl.
G06Q 99/00 (2006.01)
G06Q 30/00 (2012.01)

(52) U.S. Cl.
USPC .......................... 705/319; 705/7.29

(58) Field of Classification Search
CPC ............................... G06Q 30/02; G06Q 50/01
USPC ................................. 705/7.29, 319
See application file for complete search history.

(56) References Cited

U.S. PATENT DOCUMENTS

| | | | |
|---|---|---|---|
| 7,930,302 B2 | 4/2011 | Bandaru et al. | |
| 2007/0214097 A1 | 9/2007 | Parsons et al. | |
| 2008/0133488 A1 | 6/2008 | Bandaru et al. | |
| 2009/0216747 A1 | 8/2009 | Li et al. | |
| 2010/0121849 A1* | 5/2010 | Goeldi | 707/736 |
| 2010/0246797 A1* | 9/2010 | Chavez et al. | 379/265.02 |
| 2010/0293560 A1* | 11/2010 | Bland et al. | 719/328 |
| 2010/0325107 A1* | 12/2010 | Kenton et al. | 707/723 |
| 2011/0125550 A1* | 5/2011 | Erhart et al. | 705/7.29 |
| 2011/0191417 A1 | 8/2011 | Rathod | |
| 2011/0246378 A1* | 10/2011 | Prussack et al. | 705/310 |
| 2011/0320542 A1* | 12/2011 | Bendel et al. | 709/206 |

OTHER PUBLICATIONS

"Genesys Social Media Solution: Arm Your Organization with the Power of Social Media Insight," Genesys an Alcatel-Lucent Company, 2010.*
"Customer Collaboration," Cisco, 2010.*
"Alcatel Lucent: Alcatel-Lucent Genesys maps out successful social media strategy for enterprises that includes strong linkage between customer service and marketing; Innovative new vision and social media tools showcased at G-Force Melbourne," Anonymous. M2 Presswire Aug. 17, 2010, http://search.proquest.com/docview/808576457?accountid=14753.*
"Social media-Evolution of customer service and sales," Communications Today, Aug. 2010, http://search.proquest.com/docview/742638288?accountid=14753.*
Henschen, Doug, "Social Networks Meet Customer Service," Informationweek.com, Oct. 18, 2010, discloses how social networks have become channels for customer feedback and support.*

(Continued)

*Primary Examiner* — Andre Boyce
*Assistant Examiner* — Renae Feacher
(74) *Attorney, Agent, or Firm* — Fish & Richardson P.C.

(57) ABSTRACT

Methods, systems, and apparatus, including computer programs encoded on a computer storage medium, for prioritizing social activity postings. In one aspect, a method includes receiving a request for prioritized social activity postings, the request being associated with a company identifier. Social activity postings are identified. The social activity postings are available to users on a social activity system of one or more computers, and each social activity posting is associated with a user identifier. For each social activity posting, the user identifier associated with the social activity posting is matched with a customer identifier associated with the company identifier. A respective priority rating is determined for the social activity posting using configuration information associated with the customer identifier.

17 Claims, 5 Drawing Sheets

(56) References Cited

OTHER PUBLICATIONS

Petouhoff, Natalie, "The Social Customer Economy," Customer Relationship Management, Mar. 2010.*

Fisher, Mike, "Mining and Monitoring Social Media," Interactive, DMNews, List & Database Marketing Guide, 2010.*

The Rise of Social Networking and Emerging Channels in Customer Service (Strategic Focus) Anonymous. Business Wire [New York] May 27, 2009.*

* cited by examiner

PRIORITIZING SOCIAL ACTIVITY POSTINGS

TECHNICAL FIELD

The present disclosure relates to software, computer systems, and computer implemented methods for prioritizing social activity postings.

BACKGROUND

Social media sites are becoming increasingly popular. Companies use social media to receive feedback from customers about products and services. For example, a company can set up a home page on a social networking site where customers can post comments. As another example, a company can monitor public posts on a social networking site for posts mentioning the company's name, products, or services. In this manner, a company can receive both direct feedback and indirect feedback that can be used to improve products and services.

SUMMARY

In general, one aspect of the subject matter described in this specification can be embodied in methods that include the actions of receiving a request for prioritized social activity postings, the request being associated with a company identifier; identifying a plurality of social activity postings available to a plurality of users on a social activity system of one or more computers, each social activity posting associated with a user identifier; for each social activity posting, matching the user identifier associated with the social activity posting with a customer identifier associated with the company identifier and determining a respective priority rating for the social activity posting using configuration information associated with the customer identifier; ranking the social activity postings in order of the respective priority ratings; and providing the social activity postings in the ranked order of the respective priority ratings. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. Determining the respective priority rating for a social activity posting comprises receiving a social influence score for the user identifier associated with the social activity posting. The social influence score for the user identifier is determined based at least in part on one or more of: a plurality of other social activity postings associated with the user identifier; a plurality of follower user identifiers associated with the user identifier; and a count of responsive social activity postings made in response to social activity postings associated with the user identifier. Determining the respective priority rating for a social activity posting comprises: determining an internal customer importance score using the configuration information associated with the customer identifier; determining a weighted internal customer importance score using the internal customer importance score and a first weighting factor specified by the configuration information; determining a weighted social influence score using the social influence score and a second weighting factor specified by the configuration information; and combining the weighted social influence score with the weighted customer importance score. Determining the respective priority rating for a social activity posting comprises receiving a message sentiment score based at least in part on text contained in the particular social activity posting, the message sentiment score being in a range between a positive sentiment score and a negative sentiment score, the message sentiment score being based on the presence or absence of positive or negative words in the text. Determining the respective priority rating for a social activity posting comprises receiving a problem severity score based on text contained in the particular social activity posting, the problem severity score being in a range between a major problem score and a minor problem score, the problem severity score being based on the presence or absence of severe problem words in the text. Determining the respective priority rating for a social activity posting comprises: identifying one or more child social activity postings of the social activity posting, each child social activity posting being made in response to the social activity posting, each child social activity posting being associated with a user identifier; determining a respective child priority score for each of the one or more child social activity postings; and determining the respective priority rating for the social activity posting using the child priority scores for the child social activity postings. Determining the child priority score for a particular child social activity posting comprises: determining that the particular child social activity posting indicates approval of the social activity posting; and determining the child priority score using a score of the social activity posting based on text contained in the social activity posting. Determining the respective priority rating for a particular social activity posting comprises: receiving a problem severity score based on text contained in the social activity posting, the problem severity score being in a range between a major problem score and a minor problem score, the problem severity score being based on the presence or absence of severe problem words in the text; determining an internal customer importance score using the configuration information associated with the customer identifier; and multiplying the problem severity score by a combination of the internal customer importance score and a sum of the child priority scores for the child social activity postings. Determining the respective priority rating for a social activity posting comprises determining the priority rating is proportional to:

$$PS\left[a(MSc*CIc) + b\sum_{i=1}^{NL+NC}(MSi*SIi)\right];$$

wherein: PS is the problem severity score; MSc is a message sentiment score based on text contained in the social activity posting, the message sentiment score being in a range between a positive sentiment score and a negative sentiment score, the message sentiment score being based on the presence or absence of positive or negative words in the text; CIc is a customer importance score based on the internal customer importance score and a social influence score for the user identifier associated with the social activity posting; MSi is a child message sentiment score for a respective child social activity posting; SIi is a child social influence score for the user identifier associated with the respective child social activity posting; NL is a number of child social activity postings indicating approval of the particular social activity posting and lacking associated text; NC is a number of child social activity postings having associated text; and a and b are configurable parameters specified by the configuration information.

Particular embodiments of the subject matter described in this specification can be implemented so as to realize none, one, or more of the following advantages. Social activity postings related to a company or its products or services can be transformed into actionable request for a company agent to handle. The social activity postings can be prioritized so that the agent can efficiently respond to the postings in a timely manner. The prioritization can be based on various factors. The factors can be configured by the company to adjust the prioritization.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

A social activity priority system prioritizes social activity postings made by various users regarding a company or its products or services. An agent of the company can respond to the social activity postings in the priority order instead of, e.g., the chronological order that the postings were made. The social activity priority system prioritizes the social activity postings using, for example, a customer importance score, a message sentiment score, a problem severity score, and/or scores of child postings.

Figure 1A:
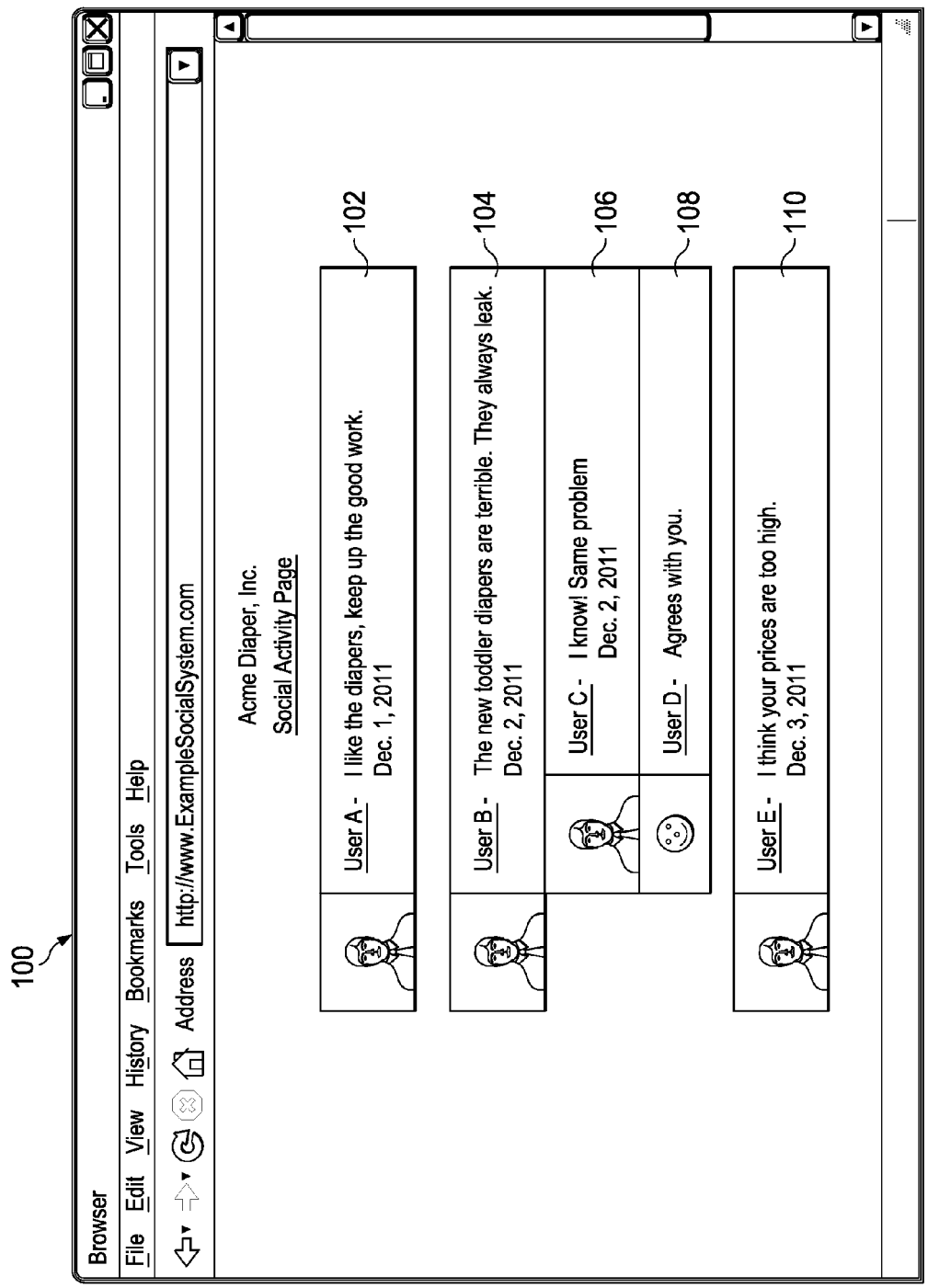
FIG. 1A illustrates an example social activity system interface for a social activity system as displayed in a web browser.

FIG. 1A illustrates an example social activity system interface 100 for a social activity system as displayed in a web browser. The social activity system interface 100 displays a feedback page for an example company, "Acme Diaper, Inc." Users of the social activity system can post comments on the feedback page, see what comments other users have posted, and post comment on other users' postings, for example. The comments can be in chronological order or another order.

A first comment 102 is associated with a user identifier "User A." The first comment 102 has a generally positive sentiment and does not report a problem. A second comment 104 from "User B" reports a problem with a product and has a generally negative sentiment. The second comment 104 also has two child postings 106 and 108 associated with it. The first child posting 106, from "User C," includes original text reflecting on the second comment 104. The second child posting 108, from "User D," does not include original text. Instead, it merely reflects approval of the second comment 104, e.g., by standard language and a standard graphical element. A third comment 110 from "User B" has a somewhat negative sentiment and does not report a problem.

Figure 1B:
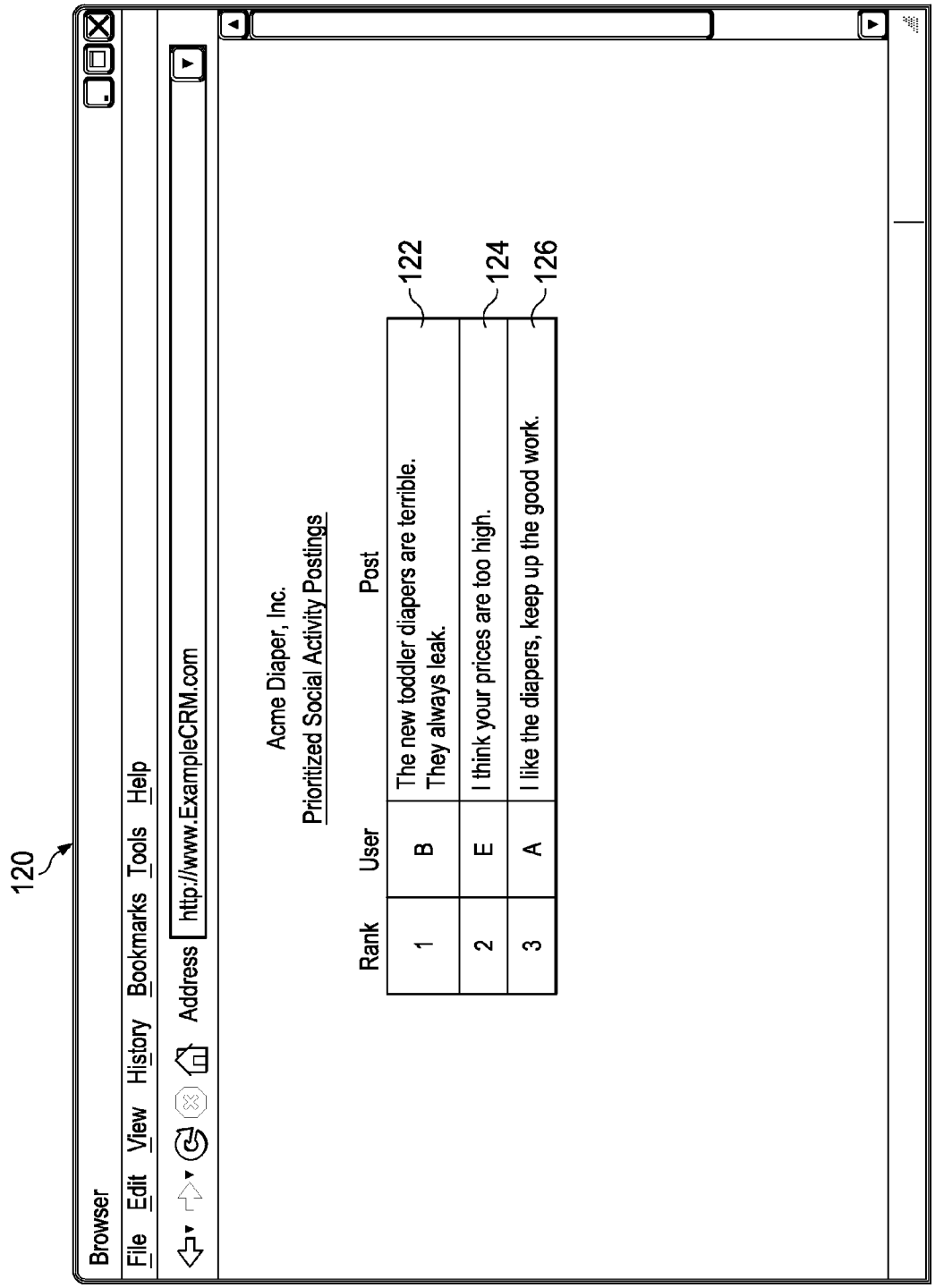
FIG. 1B illustrates an example interface to a social activity prioritization system as displayed in a web browser.

FIG. 1B illustrates an example interface 120 to a social activity prioritization system as displayed in a web browser. The interface 120 displays prioritized social activity postings for Acme Diaper. The social activity prioritization system gathered the comments 102-110 from the social activity system and ranked them for display in the interface 120.

A first row 122 includes the second comment 104 from the feedback page as the highest ranked social activity posting. The second comments 104 was ranked highest, for example, because it reported a problem, had a negative sentiment, and had child comments. A second row 124 includes the third comment 110 from the feedback page, and a third row 126 includes the first comment 102 from the feedback page.

By prioritizing the social activity postings, an agent from Acme Diaper can respond to the postings in order of priority, instead of in a chronological or other order. Hence the agent may be able to respond more quickly to more urgent or severe posts. For example, the agent could respond to the second comment 104 by saying "We apologize that some of the new toddler diapers malfunctioned. We have fixed the problem and are offering a refund to customers who purchased malfunctioning diapers."

Figure 2:
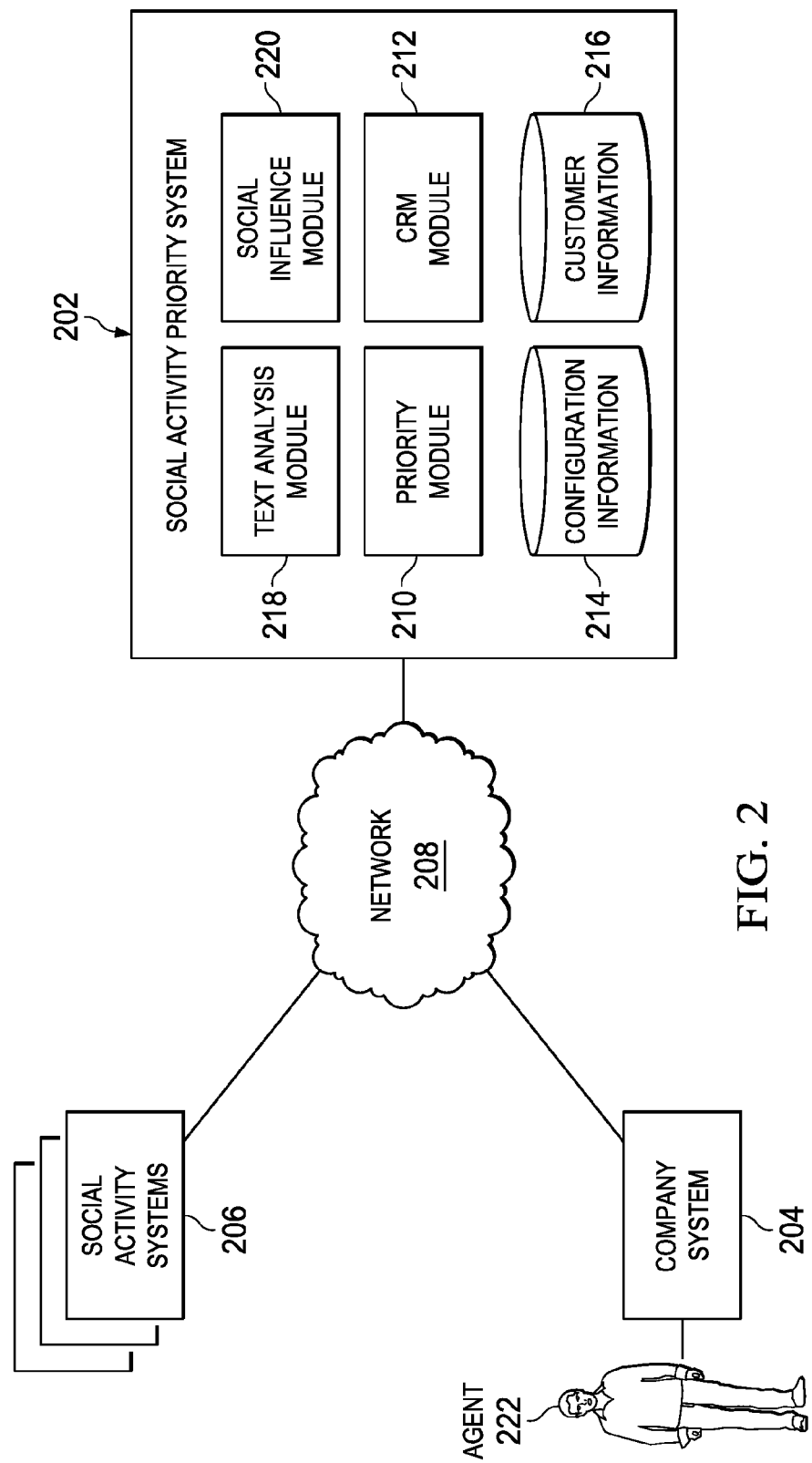
FIG. 2 illustrates an example social activity priority system configured to prioritize social activity postings.

FIG. 2 illustrates an example social activity priority system 202 configured to prioritize social activity postings. The social activity priority system 202 can be implemented, for example, in a system of one or more computers. The social activity priority system 202 communicates over a computer network 208 with other computer systems, e.g., a company computer system 204 and a social activity system 206.

The social activity priority system 202 receives social activity postings from the social activity system 206 and possibly other social activity systems. The social activity system 206 is configured to host social activity postings from various users. A social activity posting can be any type of digital information that is associated with a user identifier and is made available to other users. For example, a typical social activity posting is a text comment that is posted to the social activity system 206. In general, a social activity posting is made available to a limited number of users associated with the user identifier of the posting, e.g., a list of friends or followers, but a social activity posting can be made publicly available to anyone.

The social activity priority system 202 receives social activity postings that are associated with a company or the company's products or services. For example, if the company has a feedback page hosted on the social activity system 206, then the social activity priority system 202 receives the social activity postings made on the feedback page. In another example, the social activity priority system 202 receives general social activity postings from the social activity system 206 and filters those postings for postings associated with the company. The system can filter the social activity postings, for example, by searching for postings that include the company's name, or a product or service name.

An agent 222 for the company uses a company system 204 to access the social activity priority system 202. The company system 204 is, for example, a computer or a mobile device. The social activity priority system 202 provides prioritized social activity postings to the company system 204, which can display the prioritized social activity postings in a web browser or other application, e.g., as shown in FIG. 1B. The agent 222 can respond to social activity postings on the social activity system 206 using the company system 204.

The social activity priority system 202 includes a priority module 210. The priority module 210 is configured so that, when the social activity priority system 202 executes the priority module 210, the priority module prioritizes received social activity postings. The priority module 210 prioritizes social activity postings using configuration information 214. The agent 222 can modify the configuration information 214 to suit the needs of the company.

The social activity priority system 202 can be configured to perform functions other than prioritizing social activity postings. For example, the social activity priority system 202 can include a customer relationship management (CRM) module 212. The CRM module 212 is configured so that, when the social activity priority system 202 executes the CRM module 212, the CRM module 212 performs various CRM functions, e.g., for the company. The CRM module 212 can collect customer information 216. Customer information 216 for the company can include, e.g., a list of customers, a list of user identifiers associated with each customer, an importance score for each customer, and so on.

The priority module 210 can use various factors in prioritizing social activity postings. For example, the priority module 210 can use a text analysis module 218 to analyze text of a social activity posting and generate a message sentiment score, a problem severity score, or both. In another example, the priority module 210 can use a social influence module 226 to calculate a social influence score for a user identifier associated with a social activity posting. The priority module can also use any child postings associated with a social activity posting.

Figure 3:
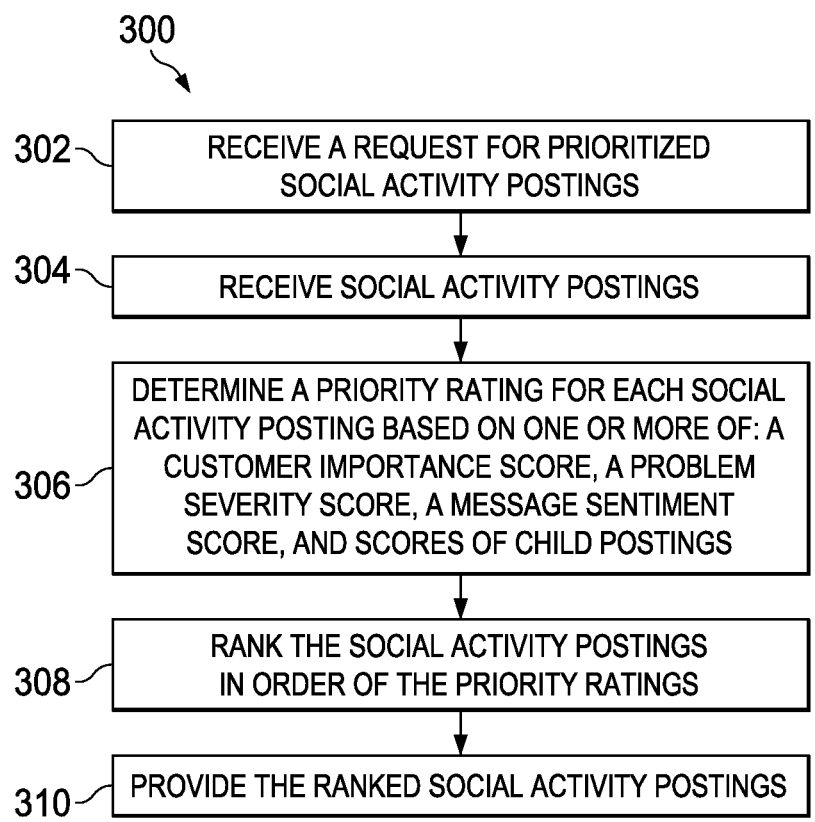
FIG. 3 is a flow diagram of a process for prioritizing social activity postings.

FIG. 3 is a flow diagram of a process 300 for prioritizing social activity postings. A system of one or more computers can perform the process 300, e.g., the social activity priority system 202 of FIG. 2. For purposes of illustration, the process 300 will be described with respect to a system that performs the process 300.

The system receives a request from a company computer system (e.g., the company system 204 of FIG. 2) for prioritized social activity postings (step 302). The request is associated with a company identifier. For example, an agent (e.g., the agent 122 of FIG. 1) can send the request. The agent can log in to an account with the system. The account can be shared with, for example, a CRM service, or other types of services.

The system receives social activity postings for the company associated with the company identifier (step 304). For example, the system can request the social activity postings from one or more social activity systems (e.g., the social activity system 206 of FIG. 2). Each social activity posting is associated with a user identifier (e.g., an account name for an account with the social activity system). Each social activity posting is made available to users on a social activity system of one or more computers.

The system determines a respective priority rating for each social activity posting (step 306). The priority rating of a particular social activity posting is based on one or more of: a customer importance score, a problem severity score, a message sentiment score, and scores of child postings.

Customer Importance Score

A customer importance score can be based on an internal customer importance score, a social influence score, or both. To determine an internal customer importance score, the system matches the user identifier associated with the particular social activity posting with a customer identifier. The customer identifier is associated with the company identifier. For example, the customer identifier can be the name of a customer as used in a CRM service.

The system can matching a user identifier with a customer identifier in various ways. In general, the system can use any of various appropriate techniques drawn from Master Data Management (MDM) or Data Quality (DQ) techniques. For example, suppose that the system provides a CRM service to the company and stores records for various customers (e.g., in the customer information repository 216 of FIG. 2). For a given customer, the system can store various user identifiers associated with the customer. If the given customer is a person, then the user identifiers can be, e.g., names of various social activity accounts used by the person. If the given customer is a company, then the user identifiers can be, e.g., names of various individuals who work at the company, or names of social activity accounts used by employees of the company. To match a user identifier with a customer identifier, the system can search the customer information for various customers to identify a customer having the user identifier associated with the customer.

After matching the user identifier with the customer identifier, the system determines the customer importance score using configuration information associated with the customer identifier. The configuration information can be stored, for example, in the configuration information repository 214 of FIG. 2.

The configuration information can include an internal customer importance score. The internal customer importance score can be assigned by an agent for the company, e.g., the agent 222 of FIG. 2. The internal customer importance score represents how important that customer is to the company. For example, a customer that provides a large amount of business to the company can have a higher internal customer importance score than a customer that provides a small amount of business. As another example, a customer that is influential within a community of customers can have a higher internal customer importance score than a customer with less influence in the community.

To determine a social influence score, the system analyzes information associated with user identifier's activity on one or more social activity systems. For example, the system can use the social influence module 220 of FIG. 2, or use a social influence service external to the system. The social influence score can be based on one or more of: other social activity postings associated with the user identifier; follower user identifiers associated with the user identifier (e.g., the number of followers or social influence scores of the followers); and a count of responsive social activity postings made in response to social activity postings associated with the user identifier. The system can use any of various appropriate techniques for determining the social influence score; for example, the system can receive social influence scores from an external service, e.g., in exchange for money.

The system can combine the internal customer importance score with the social influence score to determine a combined customer importance score. In some implementations, the combined customer importance score is proportional to internal customer importance score and the social influence score. For example, combined customer importance is a linear combination of the internal customer importance score, the social influence score, and constants. For example, the system can read weighting factors for the internal customer importance score and the social influence score from configuration information for the company. The system can then compute the combined customer importance score as: $CIc = ICIc*W1 + SIc*W2$, where $CIc$ is the combined customer importance scores, $ICIc$ is the internal customer importance score, $W1$ is the weighting factor for the internal customer importance score, $SIc$ is the social influence score, and $W2$ is the weighting factor for the social influence score. If the company does not want to use either the internal customer importance score or the social influence score, the weighting factors W1 or W2 can be set to zero to effectively turn those features off.

Message Sentiment and Problem Severity

The system can determine a message sentiment score and/or a problem severity score by analyzing text contained in the particular social activity posting. For example, the system can use the text analysis module 218 of FIG. 2. A message sentiment score indicates the sentiment of the text of the particular social activity posting. The message sentiment score can be based on the presence or absence of positive or negative words in the text, and the message sentiment score can range from a positive sentiment score and a negative sentiment score. For example, the message sentiment score can range between values for strong positive, weak positive, neutral, weak negative, and strong negative.

A problem severity score indicates whether the social activity posting describes or relates to a problem with the company or its products or services and the severity of the problem. The problem severity score can be based on the presence or absence of severe problem words in the text of the social activity posting. The problem severity score can range between a major problem score and a minor problem score.

Scores of Child Postings

The system can determine scores of child postings of the particular social activity posting. A child posting is a social activity posting that is made in response to the social activity posting. A child activity posting is associated with a user identifier. For example, FIG. 1A shows two child postings 106 and 108 of a social activity posting 104. A child posting can have its own text. A child posting can also lack its own text; in that case, the child posting can indicate approval or disapproval of the particular social activity posting. A child posting having its own text can also indicate approval or disapproval of the particular social activity posting.

The system can identify any child postings of the particular social activity posting and determine a respective child priority score for each of the child postings. Each child priority score can be based on a customer importance score, message sentiment score, and problem severity score, determined as described above. If the child posting indicates approval of the particular social activity posting, the system can determine the child priority score using any of the scores of the particular social activity posting. For example, if the child posting lacks text to analyze for determining a message sentiment score or a problem severity score, the child priority score can have the same message sentiment score or problem severity score as the particular social activity posting.

Combining Scores to Determine Priority Rating

For a particular social activity posting, the system can combine one or more of the scores described above in various ways. For example, the system can determine the priority rating of the particular social activity posting by combining the scores according to the following formula:

$$PR = PS\left[a(MSc*CIc) + b\sum_{i=1}^{NL+NC}(MSi*SIi)\right].$$

PR is the priority rating. PS is the problem severity score. MSc is the message sentiment score. CIc is the customer importance score.

NL is a number of child social activity postings indicating approval of the particular social activity posting and lacking associated text, and NC is a number of child social activity postings having associated text. The summation in the formula is a summation of the scores for all of the child postings of the particular social activity posting. MSi is a child message sentiment score for a respective child social activity posting. SIi is a child social influence score for the user identifier associated with the respective child social activity posting.

The values for a and b are configurable parameters specified by the configuration information. The values of a and b are typically positive and real. For example, the agent 222 of FIG. 2 can supply the values for a and b. Larger values for a emphasize the particular social activity posting, and larger values for b emphasize child postings.

Alternative Techniques for Combining Scores

For a particular social activity posting, the system can combine one or more of the scores described above in various ways. In some implementations, the system can determine the priority rating of the particular social activity is proportional to a product including problem severity score and a multi-term combination including other scores. The multi-term combination can include one or more terms for associated with one or more scores for a particular social activity posting and one or more terms for child social activity postings to the particular social activity posting. In some implementations, this multi-term combination includes a sum and include as a first term in the sum: a(MSc*CIc). In some implementations, the sum include as a second term:

$$c\sum_{i=1}^{NC}(MSi*SIi).$$

In some implementations, the sum include as a third term:

$$d\sum_{i=1}^{NL}(MSi*SIi).$$

The values for c and d are configurable parameters specified by the configuration information. In some implementations, the second and third terms are included in the multi-term combination. In some implementations, the sum of c and d is equal parameter b.

For a particular social activity posting, the system can combine one or more of the scores described above in various ways. For example, the system can determine the priority rating of the particular social activity posting by combining the scores according to a technique and then normalizing the result. A normalized priority rating, in some implementations, is an integer. In some implementations, a normalized priority rating bounded by about 1 and 100. In some implementations, the normalized priority rating is a decimal. In some of these implementations, the rating bounded between various ranges: 1 and 100, 1 and 10, 0 and 1, or a range suitable for the precision and impact required of a rating. A technique for normalizing a rating from a combined score is to determine a set of raw priority ratings RPR with each individual rating denoted by index j and compute the median of the set, m. Then compute a normalized priority rating that is proportional to $Max \times PRP_j/SQRT(RPR_j^2+d)$ where Max is the maximum intended value of the normalized rating, and d is a factor selected to balance the ratings. In an embodiment, d is 3 $m^2$ with the effect the median of the normalized priority ratings are centered at about half of the intended maximum.

The system optionally ranks the social activity postings in order of the respective priority ratings (step 308). The system optionally provides the social activity postings and the ranked order of the social activity postings to the company computer system (step 310). The system can provide the priority ratings of the social activity postings, the ranking of the social activity postings, or both. The priority ratings can be stored for later use.

Figure 4:
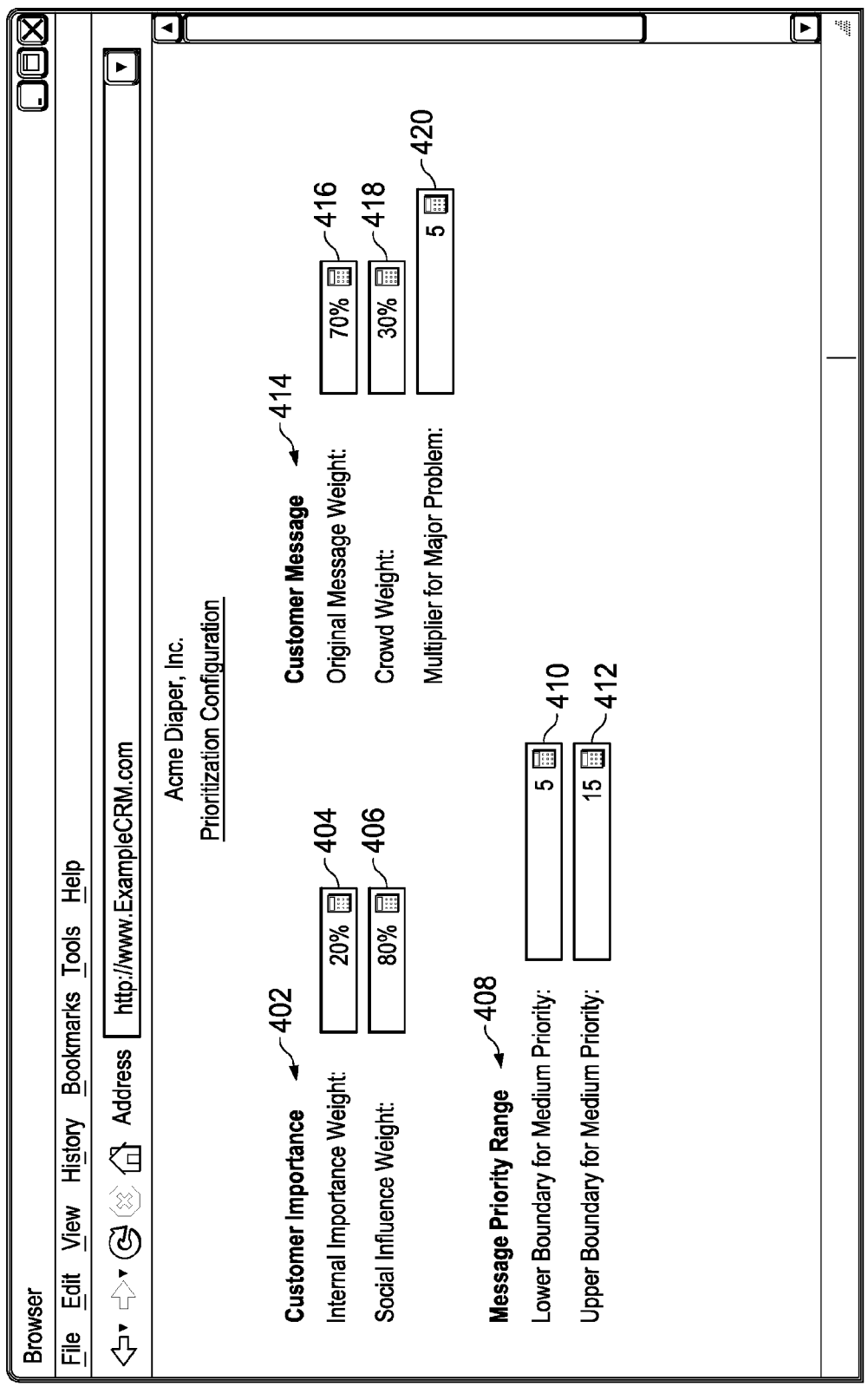
FIG. 4 illustrates an example interface to a social activity prioritization system as displayed in a web browser.

FIG. 4 illustrates an example interface to a social activity prioritization system as displayed in a web browser. The interface displays configuration information for an example company, Acme Diaper.

Using the interface, a user (e.g., the agent 222 of FIG. 2) can supply and alter configuration information for prioritizing social activity postings. The user can use a web browser or other application on a company system (e.g., the company system 204 of FIG. 2) to access a social activity priority system (e.g., the social activity priority system 202 of FIG. 2).

A first section 402 of the interface includes controls 402 and 406 for configuring the determination of a customer importance score. The controls 402 and 406 allow the user to set weighting factors for an internal customer importance score and a social influence score, e.g., as described above with respect to FIG. 3.

A second section 408 of the interface includes controls 410 and 412 for configuring values of the priority rating that are considered a "medium" priority. Social activity postings can be labeled, e.g., as "low," "medium," and "high" priority social activity postings. The labels can be shown with the ranked social activity postings.

A third section 414 of the interface includes controls 416, 418, and 420 for configuring other parameters in determining priority ratings for social activity postings. The first two controls 416 and 418 allow the user to set weighting factors to weight the importance of a particular social activity posting relative to its child postings (e.g., the values of a and b described above with respect to FIG. 3). The third control 420 allows the user to set a multiplier for a social activity posting that is flagged as a "major problem" (e.g., by text analysis of text of the social activity posting).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a system of one or more computers, the method comprising:
   receiving a request for prioritized social activity postings, the request being associated with a company identifier;
   identifying a plurality of social activity postings available to a plurality of users on a social activity system of one or more computers, each social activity posting associated with a user identifier;
   for each social activity posting, matching the user identifier associated with the social activity posting with a customer identifier associated with the company identifier and determining, by the system of one or more computers, a respective priority rating for the social activity posting using configuration information associated with the customer identifier, wherein determining the respective priority rating for a social activity posting comprises:
      identifying one or more child social activity postings of the social activity posting, each child social activity posting being made in response to the social activity posting, each child social activity posting being associated with a user identifier;
      determining a respective child priority score for each of the one or more child social activity postings; and
      determining the respective priority rating for the social activity posting using the child priority scores for the child social activity postings, wherein determining the respective priority rating for a particular social activity posting comprises:
         receiving a problem severity score based on text contained in the social activity posting, the problem severity score being in a range between a major problem score and a minor problem score, the problem severity score being based on the presence or absence of severe problem words in the text;
determining an internal customer importance score using the configuration information associated with the customer identifier; and
multiplying the problem severity score by a combination of the internal customer importance score and a sum of the child priority scores for the child social activity postings;
ranking the social activity postings in order of the respective priority ratings; and
providing the social activity postings in the ranked order of the respective priority ratings.

2. The method of claim 1, wherein determining the respective priority rating for a social activity posting comprises receiving a social influence score for the user identifier associated with the social activity posting.

3. The method of claim 2, wherein the social influence score for the user identifier is determined based at least in part on one or more of: a plurality of other social activity postings associated with the user identifier; a plurality of follower user identifiers associated with the user identifier; and a count of responsive social activity postings made in response to social activity postings associated with the user identifier.

4. The method of claim 2, wherein determining the respective priority rating for a social activity posting comprises:
determining an internal customer importance score using the configuration information associated with the customer identifier;
determining a weighted internal customer importance score using the internal customer importance score and a first weighting factor specified by the configuration information;
determining a weighted social influence score using the social influence score and a second weighting factor specified by the configuration information; and
combining the weighted social influence score with the weighted customer importance score.

5. The method of claim 1, wherein determining the respective priority rating for a social activity posting comprises receiving a message sentiment score based at least in part on text contained in the particular social activity posting, the message sentiment score being in a range between a positive sentiment score and a negative sentiment score, the message sentiment score being based on the presence or absence of positive or negative words in the text.

6. The method of claim 1, wherein determining the respective priority rating for a social activity posting comprises receiving a problem severity score based on text contained in the particular social activity posting, the problem severity score being in a range between a major problem score and a minor problem score, the problem severity score being based on the presence or absence of severe problem words in the text.

7. The method of claim 1, wherein determining the child priority score for a particular child social activity posting comprises:
determining that the particular child social activity posting indicates approval of the social activity posting; and
determining the child priority score using a score of the social activity posting based on text contained in the social activity posting.

8. The method of claim 1, wherein determining the respective priority rating for a social activity posting comprises determining the priority rating as a value proportional to:

$$PS\left[a(MSc * CIc) + b \sum_{i=1}^{NL+NC} (MSi * SIi)\right];$$

wherein:
PS is the problem severity score;
MSc is a message sentiment score based on text contained in the social activity posting, the message sentiment score being in a range between a positive sentiment score and a negative sentiment score, the message sentiment score being based on the presence or absence of positive or negative words in the text;
CIc is a customer importance score based on the internal customer importance score and a social influence score for the user identifier associated with the social activity posting;
MSi is a child message sentiment score for a respective child social activity posting;
SIi is a child social influence score for the user identifier associated with the respective child social activity posting;
NL is a number of child social activity postings indicating approval of the particular social activity posting and lacking associated text;
NC is a number of child social activity postings having associated text; and
a and b are configurable parameters specified by the configuration information.

9. An apparatus comprising instructions embodied on a tangible, non-transitory computer-readable media, the instructions operable when executed to cause a computing system to perform operations comprising:
receiving a request for prioritized social activity postings, the request being associated with a company identifier;
identifying a plurality of social activity postings available to a plurality of users on a social activity system of one or more computers, each social activity posting associated with a user identifier;
for each social activity posting, matching the user identifier associated with the social activity posting with a customer identifier associated with the company identifier and determining a respective priority rating for the social activity posting using configuration information associated with the customer identifier, wherein determining the respective priority rating for a social activity posting comprises:
identifying one or more child social activity postings of the social activity posting, each child social activity posting being made in response to the social activity posting, each child social activity posting being associated with a user identifier;
determining a respective child priority score for each of the one or more child social activity postings; and
determining the respective priority rating for the social activity posting using the child priority scores for the child social activity postings, wherein determining the respective priority rating for a particular social activity posting comprises:
receiving a problem severity score based on text contained in the social activity posting, the problem severity score being in a range between a major problem score and a minor problem score, the problem severity score being based on the presence or absence of severe problem words in the text;

determining an internal customer importance score using the configuration information associated with the customer identifier; and multiplying the problem severity score by a combination of the internal customer importance score and a sum of the child priority scores for the child social activity postings;

ranking the social activity postings in order of the respective priority ratings; and providing the social activity postings in the ranked order of the respective priority ratings.

10. The apparatus of claim 9, wherein determining the respective priority rating for a social activity posting comprises receiving a social influence score for the user identifier associated with the social activity posting.

11. The apparatus of claim 10, wherein the social influence score for the user identifier is determined based at least in part on one or more of: a plurality of other social activity postings associated with the user identifier; a plurality of follower user identifiers associated with the user identifier; and a count of responsive social activity postings made in response to social activity postings associated with the user identifier.

12. The apparatus of claim 10, wherein determining the respective priority rating for a social activity posting comprises:

determining an internal customer importance score using the configuration information associated with the customer identifier;

determining a weighted internal customer importance score using the internal customer importance score and a first weighting factor specified by the configuration information;

determining a weighted social influence score using the social influence score and a second weighting factor specified by the configuration information; and combining the weighted social influence score with the weighted customer importance score.

13. The apparatus of claim 9, wherein determining the respective priority rating for a social activity posting comprises receiving a message sentiment score based at least in part on text contained in the particular social activity posting, the message sentiment score being in a range between a positive sentiment score and a negative sentiment score, the message sentiment score being based on the presence or absence of positive or negative words in the text.

14. The apparatus of claim 9, wherein determining the respective priority rating for a social activity posting comprises receiving a problem severity score based on text contained in the particular social activity posting, the problem severity score being in a range between a major problem score and a minor problem score, the problem severity score being based on the presence or absence of severe problem words in the text.

15. The apparatus of claim 9, wherein determining the child priority score for a particular child social activity posting comprises:

determining that the particular child social activity posting indicates approval of the social activity posting; and determining the child priority score using a score of the social activity posting based on text contained in the social activity posting.

16. The apparatus of claim 9, wherein determining the respective priority rating for a social activity posting comprises determining the priority rating as a value proportional to:

$$PS\left[a(MSc * CIc) + b \sum_{i=1}^{NL+NC} (MSi * SIi)\right];$$

wherein:

PS is the problem severity score;

MSc is a message sentiment score based on text contained in the social activity posting, the message sentiment score being in a range between a positive sentiment score and a negative sentiment score, the message sentiment score being based on the presence or absence of positive or negative words in the text;

CIc is a customer importance score based on the internal customer importance score and a social influence score for the user identifier associated with the social activity posting;

MSi is a child message sentiment score for a respective child social activity posting;

SIi is a child social influence score for the user identifier associated with the respective child social activity posting;

NL is a number of child social activity postings indicating approval of the particular social activity posting and lacking associated text;

NC is a number of child social activity postings having associated text; and a and b are configurable parameters specified by the configuration information.

17. A computing system, comprising one or more memory modules, one or more processors, and instructions stored on one or more of the memory modules and operable when executed with the one or more processors to perform operations comprising:

receiving a request for prioritized social activity postings, the request being associated with a company identifier;

identifying a plurality of social activity postings available to a plurality of users on a social activity system of one or more computers, each social activity posting associated with a user identifier;

for each social activity posting, matching the user identifier associated with the social activity posting with a customer identifier associated with the company identifier and determining a respective priority rating for the social activity posting using configuration information associated with the customer identifier, wherein determining the respective priority rating for a social activity posting comprises:

identifying one or more child social activity postings of the social activity posting, each child social activity posting being made in response to the social activity posting, each child social activity posting being associated with a user identifier;

determining a respective child priority score for each of the one or more child social activity postings; and determining the respective priority rating for the social activity posting using the child priority scores for the child social activity postings, wherein determining the respective priority rating for a particular social activity posting comprises:

receiving a problem severity score based on text contained in the social activity posting, the problem severity score being in a range between a major problem score and a minor problem score, the problem severity score being based on the presence or absence of severe problem words in the text;

determining an internal customer importance score using the configuration information associated with the customer identifier; and multiplying the problem severity score by a combination of the internal customer importance score and a sum of the child priority scores for the child social activity postings;

ranking the social activity postings in order of the respective priority ratings; and providing the social activity postings in the ranked order of the respective priority ratings.

* * * * *